(No Model.) 5 Sheets—Sheet 3.
C. RAYMOND.
MACHINE FOR PREPARING MOLDINGS FOR GILDING.
No. 393,451. Patented Nov. 27, 1888.
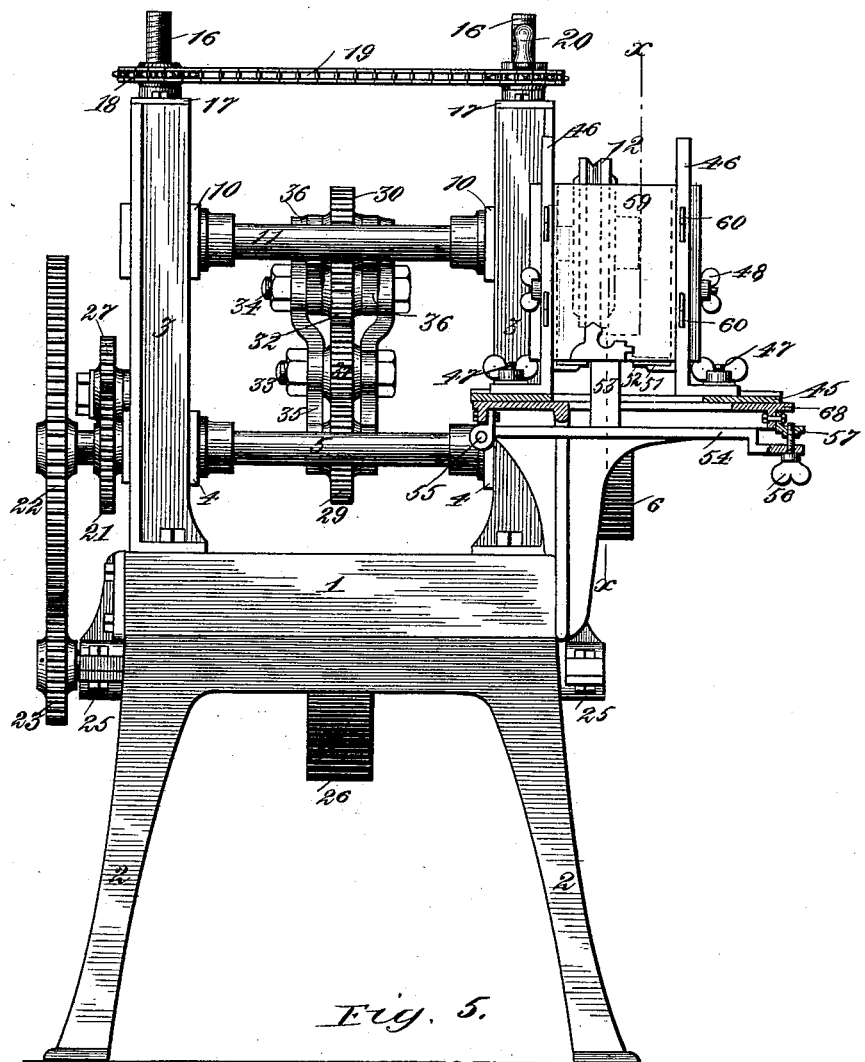

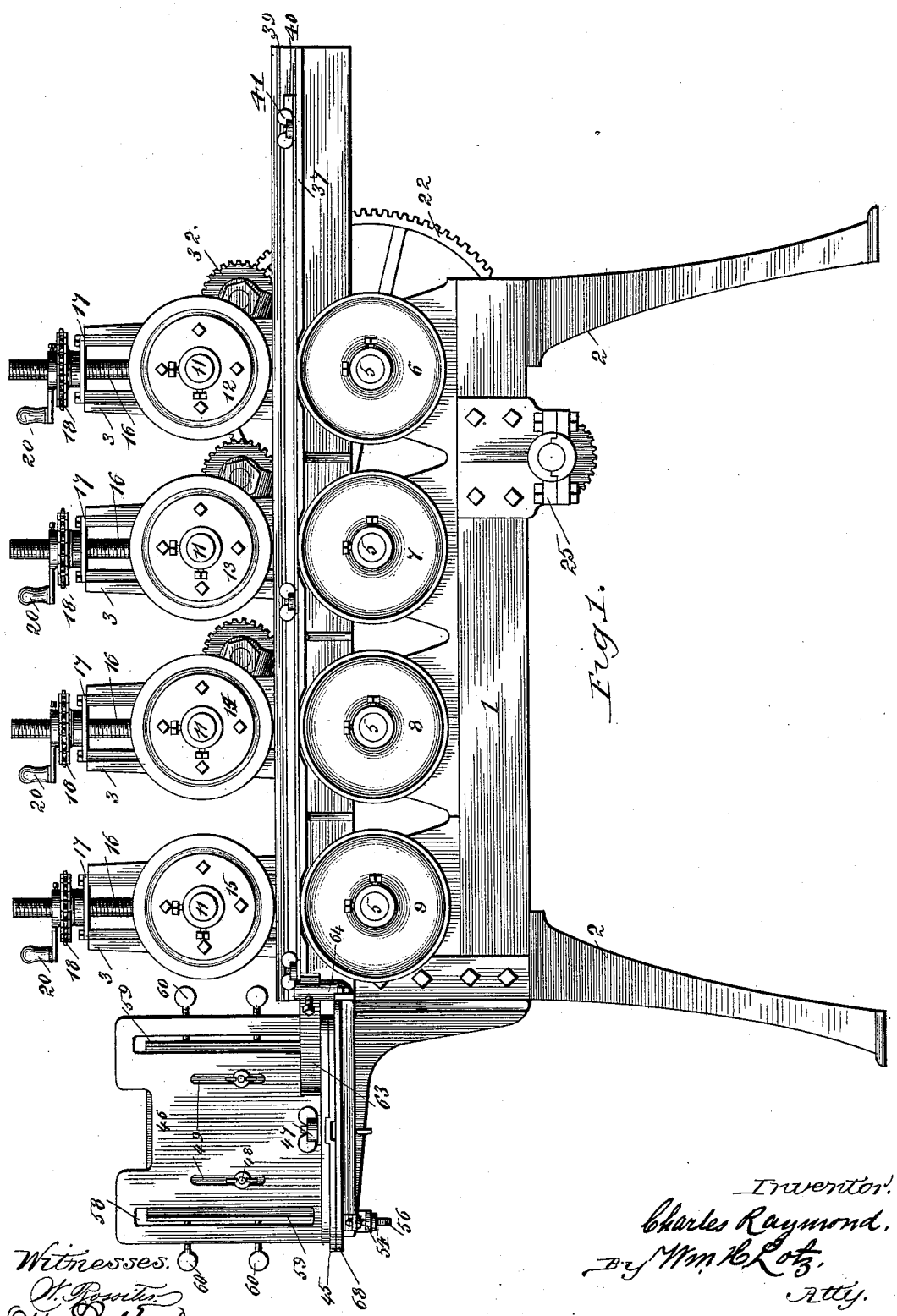

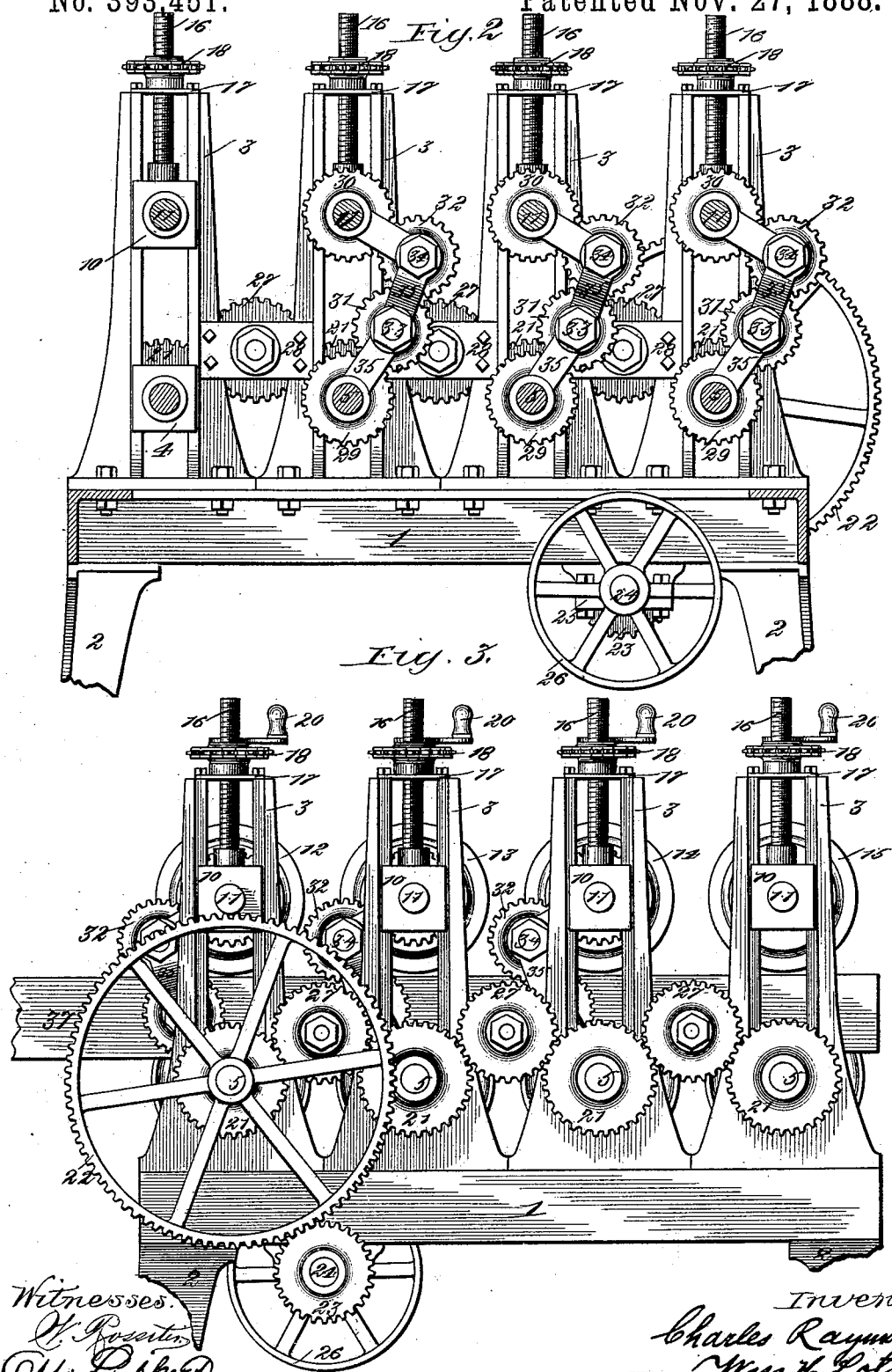

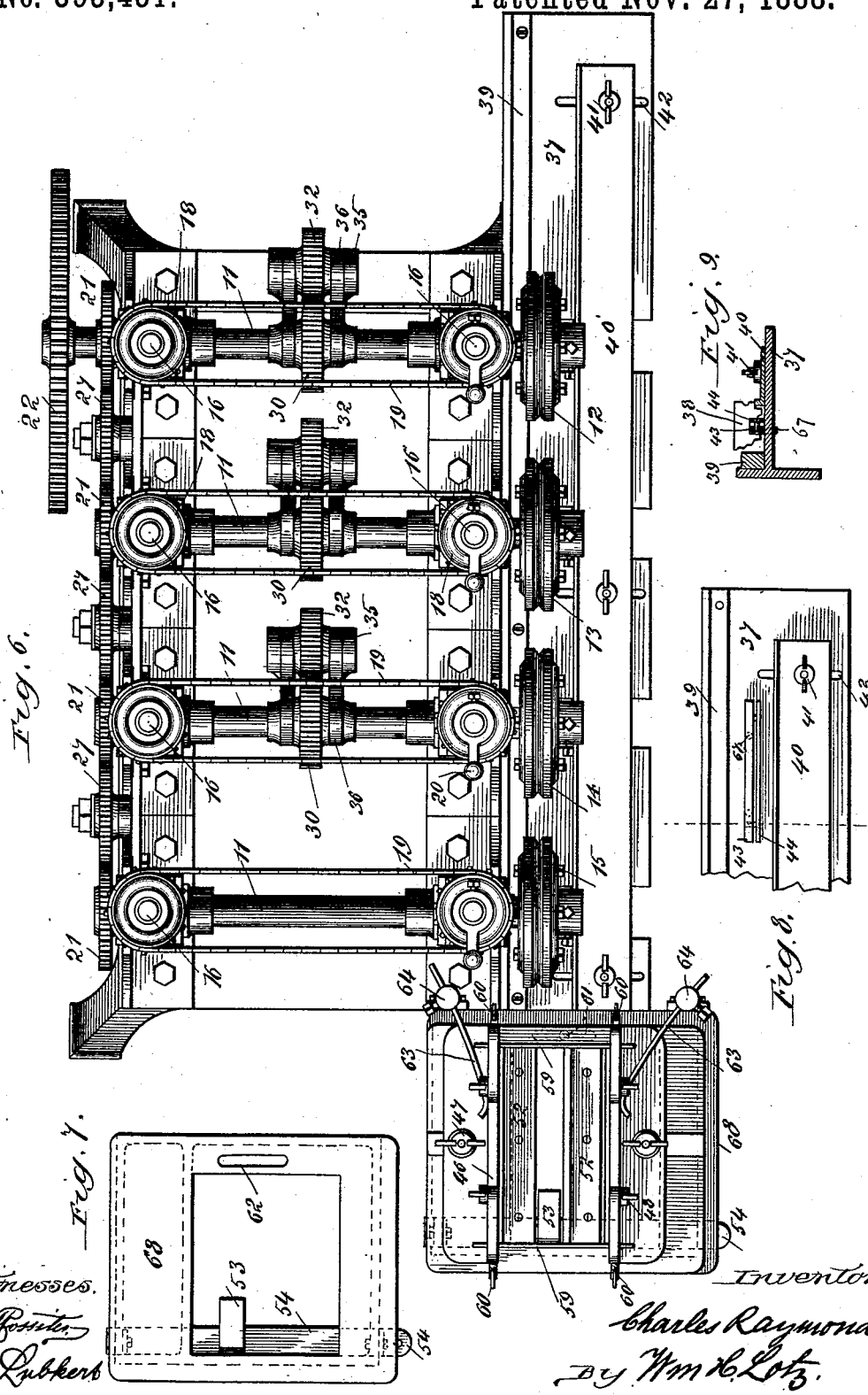

(No Model.) 5 Sheets—Sheet 5.
C. RAYMOND.
MACHINE FOR PREPARING MOLDINGS FOR GILDING.
No. 393,451. Patented Nov. 27, 1888.
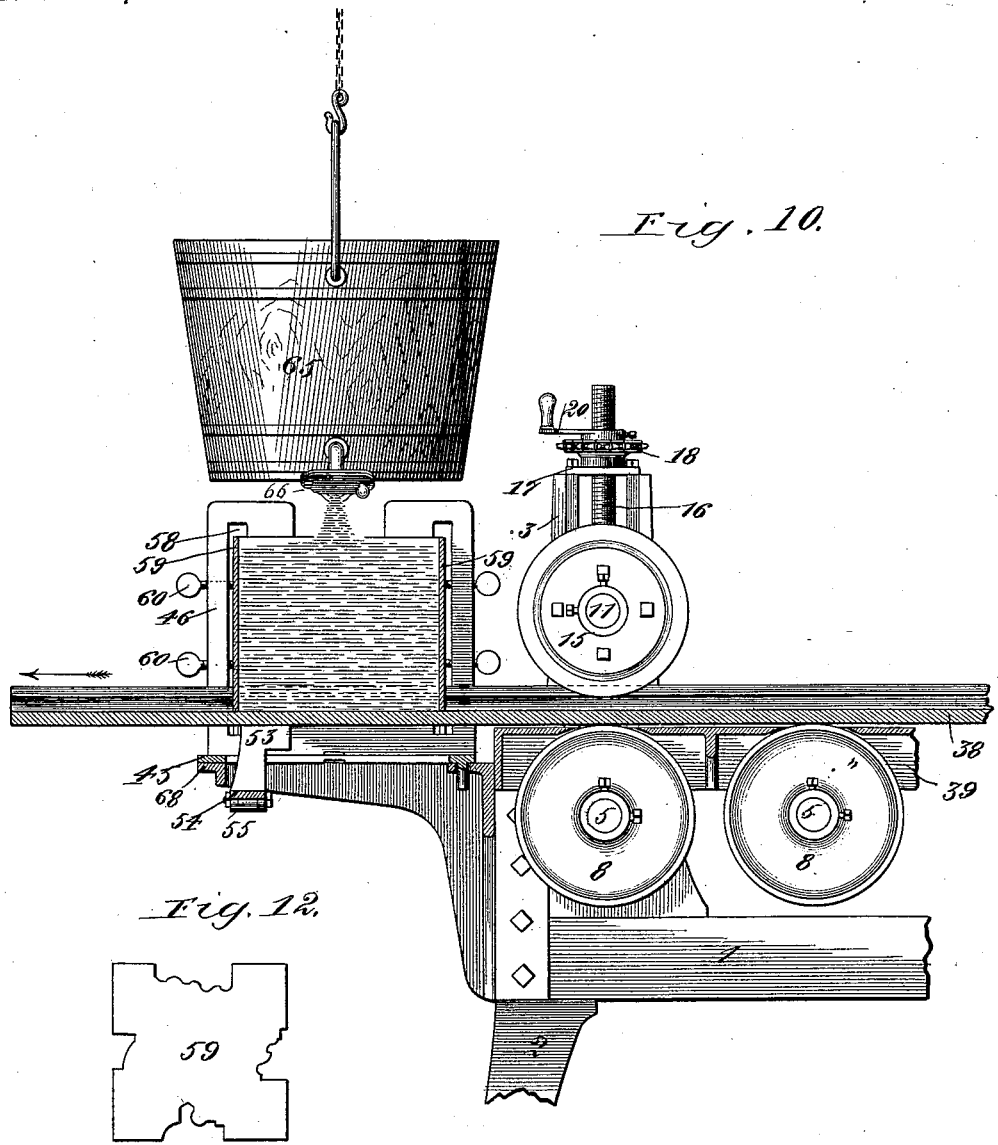
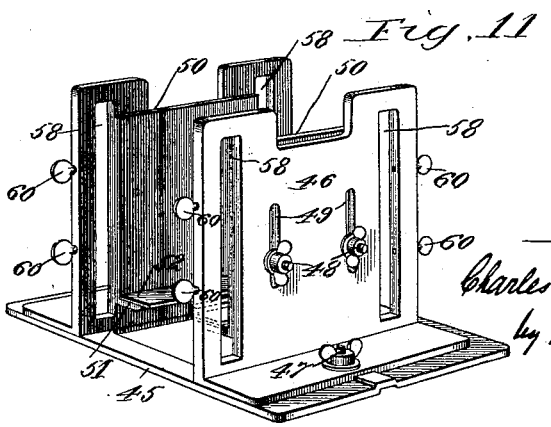
Witnesses.
V. Rossiter.
Otto Lubkert.
Inventor,
Charles Raymond.
by Wm. C. Lotz.
Attorney.

UNITED STATES PATENT OFFICE.

CHARLES RAYMOND, OF CHICAGO, ILLINOIS.

MACHINE FOR PREPARING MOLDINGS FOR GILDING.

SPECIFICATION forming part of Letters Patent No. 393,451, dated November 27, 1888.

Application filed May 28, 1888. Serial No. 275,395. (No model.)

*To all whom it may concern:*

Be it known that I, CHARLES RAYMOND, a citizen of the United States of America, residing at Chicago, in the county of Cook and State of Illinois, have invented certain new and useful Improvements in Machines for Preparing Moldings for Gilding, of which the following is a specification, reference being had therein to the accompanying drawings.

This invention relates to machines for coating wooden moldings with a composition usually mixed of glue and whiting to produce a smooth and hard surface, which is afterward gilded or otherwise ornamented.

It has been the object of this my invention to provide a machine that is more complete and perfect in its operation than machines heretofore built for that purpose; and with that object in view my invention consists of the novel devices and combinations of devices hereinafter described and specifically claimed.

In the accompanying drawings, Figure 1 represents a front elevation of the machine; Fig. 2, a longitudinal vertical section of the same; Fig. 3, a rear elevation; Fig. 4, a sectional end elevation of the machine; Fig. 5, a portion of this sectional end elevation drawn on a larger scale; Fig. 6, a plan view of the machine; Fig. 7, a detached plan view of the base-plate of the composition-receptacle and molding-supporting lever; Figs. 8 and 9, a plan and cross-section of the guide-table for the molding; Fig. 10, a section on line $x\, x$ in Fig. 4; Fig. 11, a perspective view of the composition-receptacle, and Fig. 12 an elevation of the templet for the same.

Corresponding referential characters designate like parts in the several figures of the drawings.

The main frame 1 of the machine is rectangular, and is supported on four legs, 2. Upon each side of this frame 1 are secured by bolts four housings, 3, forming the supports for the stationary journal-boxes 4 for the shafts 5, having removably mounted upon their forwardly-overhanging ends the lower feed-wheels, 6, 7, 8, and 9. These housings 3 also form the guides for the vertically-sliding journal-boxes 10, carrying shafts 11, that have removably mounted upon their forwardly-overhanging ends the feed-wheels 12, 13, 14, and 15. The journal-boxes 10 have each a rigid screw-threaded stud, 16, which extends upwardly through holes in cap-plates 17, bolted upon the upper extremities of housings 3, and each such stud 16 engages with the internally-screw-threaded hub of a sprocket-wheel, 18, and each pair of sprocket-wheels 18 thus supporting a shaft, 11, are coupled by an endless chain, 19, in such manner that the rotation of one will be transmitted to the other, and that a shaft, 11, while being raised or lowered by turning the wheels 18 in one direction or the other, will always be on a horizontal line. The front row of sprocket-wheels 18 are provided each with a crank, 20, for turning it.

Upon the rearwardly-projecting end of each shaft 5 is rigidly mounted a pinion, 21, and upon one shaft, 5, is also mounted a large spur-wheel, 22, engaging with a pinion, 23, of a shaft, 24, journaled in boxes 25, secured to the bottom of frame 1, and a pulley, 26, is mounted upon such shaft 24, for driving the machine by a belt. A pinion, 27, pivoted to a plate, 28, bolted between housings 3, is interposed between each pair of pinions 21, to transmit motion from one to the other, in such manner that all the shafts 5, with feed-wheels 6, 7, 8, and 9, will be rotated simultaneously in the same direction and with a uniform velocity.

Upon about the middle of three shafts, 5, are also mounted pinions 29, and upon three shafts, 11, are mounted pinions 30, and motion is imparted from each shaft 5 to the shaft 11, vertical above it, by two intermediate pinions, 31 and 32, pivoted upon journal-pins 33 and 34, secured between arms 35, which with their lower eyed ends are sleeved upon shafts 5 in such manner that pinion 31 will be held in gear with pinion 29, and that pinion 32 will be held in gear with pinion 31, while the upper journal-pins, 34, are coupled to shafts 11 by links 36, that will hold the pinions 32 in gear with pinions 30, all in such manner that a vertical adjustment by raising or lowering of either shaft 11 will not interfere with the transmission of movement from shafts 5 to shafts 11, and that the feed-wheels 12, 13, and 14 will be rotated simultaneously with the same velocity as feed-wheels 6, 7, 8, and 9, but in an opposite direction.

Against the faces of front housings, 3, is secured a horizontal table, 37, the upper face of which will be about in line with the top periphery of feed-wheels 6, 7, 8, and 9, to make room for which said table 37 is notched out over each such wheel. The molding 38 is moved over this table with a uniform velocity by passing between the lower feed-rollers, 6, 7, 8, and 9, and the upper feed-rollers, 12, 13, 14, and 15, which latter are provided with an elastic rim. The molding is guided upon table 37 between strips 39 and 40, the latter being adjustably secured by thumb-screws 41, passed through transverse slots 42 of such table. For guiding moldings having a double rabbet, an extra guide-piece is used, consisting of a thicker bar, 43, and a thinner bar, 44, both adjustably connected by screws for setting them more or less apart, according to the width of such double rabbet. The thicker bar 43 of this guide-piece is provided at its bottom face with studs 67, which enter corresponding holes in the table, so this guide-piece can be quickly attached or removed when desired, all as shown by Figs. 8 and 9. The wheels 6 7 8 9 and 12 13 14 15, being secured upon their shafts by set-screws, can be laterally adjusted or exchanged to accommodate them to the position and shape of the molding to be fed between them.

Against the end of frame 1 and guide-table 37 is secured another horizontal table, 68, having supporting-brackets bolted to such frame 1 and table 37, and having a square opening in its face, and on table 68 is supported the plate 45, also provided with a square opening. This plate 45 has a feather formed longitudinally upon its center line, engaging grooves in the base-flanges of two standard-plates, 46, which form the two opposite sides of the composition-receptacle. These plates 46 are secured upon plate 45 by bolts 47, having thumb-nuts, and against its inward face each plate 46 has adjustably secured, by screw-studs 48, passed through vertical slots 49 and having thumb-nuts, a plate, 50, provided on its lower end with a horizontal flange, 51, upon which guide-plates 52 for the molding are placed, and between these flanges 51 and guide-plates 52 of the opposing plates 50 is provided a bearing-block, 53, secured upon or forming part of a bar, 54, attached with one end by a hinge, 55, under the rear end of table 68, while its forward end is adjustably coupled by a thumb-screw, 56, to a bracket, 57, secured against the front face of table 68.

The standard-plates 46 have each in its side ends vertical slots 58, for placing therein the templet-plates 59, adjustably secured by set-screws 60, tapped through the edges of these plates 46. These plates 46, with templet-plates 59, together will form the square receptacle for the composition. The plates 59 may be made to provide each with four templets, as shown by Fig. 12, and while the forward plate 59, through which the molding first enters, may be of wood, the rear plate 59 is to be preferably of steel, and the block 53 is to form the base thereto, by which the molding is adjustably guided to be scraped in said templet to apply a uniform coating of the composition, and also to produce a very smooth and highly-polished surface thereon.

The base-plate 45 of the composition-receptacle is set loosely upon the table 68, it only being held from moving longitudinally with the molding fed through it by having a downwardly-projecting stud, 61, engaging with a transverse slot, 62, in table 68. By this arrangement the receptacle can accommodate itself for both templets 59 to be in line with the molding, that sometimes may be a little curved, and leaf-springs 63, fastened by set-screws into brackets 64, secured to the table 68, will yieldingly hold the receptacle on its central position by embracing it from both sides, and will return such receptacle to its central position again whenever it has been shifted out of line by a curved piece of molding.

A reservoir, 65, is suspended over the receptacle, from which the same is filled through a faucet or valve, 66.

On account of the glue as one of the ingredients the composition must be heated to be sufficiently fluid for feeding and adhering to the molding. Therefore, as soon as this composition becomes too stiff from cooling, it has to be removed from the receptacle, to be replaced by heated composition. This removing is quickly done by unscrewing the thumb-screw 56, and thereby releasing the bar 54, holding block 53, which bar 54, swinging on hinge 55, will then drop to a vertical position, when through the opening previously occupied by block 53 the composition can be discharged into a vessel placed below the receptacle.

The moldings are fed between and pushed through the composition-holding receptacle by the rollers 6 7 8 9 and 12 13 14 15 in a continuous manner, that as fast as one strip of molding is fed through another one takes its place, the new strip being butted at its forward end against the rear end of the leaving strip. A number of coats at sufficient intervals for hardening are necessary to obtain the required thickness of coating and the desired bright finish.

What I claim is—

1. In a machine for the purpose described, the combination, with the upper and lower feed-wheels and with the feed-table and guide-strips, of a special guide-piece for double-rabbeted moldings, consisting of bars 43 and 44, connected by adjusting-screws, the bar 43 provided with studs to enter holes in the feed-table, all substantially as set forth.

2. In a machine for the purpose described, the combination, with the composition-receptacle composed of standard-plates 46 and of templet-plates 59, of vertically-adjustable plates 50, provided with horizontal flanges 51, substantially as set forth.

3. In a machine for the purpose described, the combination, with the composition-receptacle having vertically-adjustable plates 50, provided with horizontal flanges 51 and templet-plates 59, of bar 54, with pressure-block 53, secured by hinge 55, bracket 57, and adjusting-screw 56, all substantially as and for the purpose set forth.

4. In a machine for the purpose described, the combination, with the composition-receptacle provided with templet-plates 59, and a table for supporting the same, on which it may move freely, of the leaf-springs 63, for yieldingly holding such table on its central position, substantially as and for the purpose set forth.

In testimony whereof I affix my signature in presence of two witnesses.

CHARLES RAYMOND.

Witnesses:
WILLIAM H. LOTZ,
OTTO LUBKERT.